March 18, 1969  R. J. LEWIS  3,434,083

ELECTRIC TORQUE MOTOR WITH ADJUSTABLE SLOTTED POLE PIECES

Filed March 6, 1967

INVENTOR.
RICHARD J. LEWIS
BY
W. S. Thompson
ATTY 3,434,083
ELECTRIC TORQUE MOTOR WITH ADJUSTABLE
SLOTTED POLE PIECES
Richard J. Lewis, New Hartford, N.Y., assignor to The
Bendix Corporation, a corporation of Delaware
Filed Mar. 6, 1967, Ser. No. 621,018
U.S. Cl. 335—230                              4 Claims
Int. Cl. H01f 7/08

ABSTRACT OF THE DISCLOSURE

An electric torque motor with armature permanent magnet biasing flux and a pair of differentially excited coils generating a second magnetic flux to angularly displace the armature a distance proportional to the degree of imbalance. A pair of slotted pole pieces are provided with one half of each affixed to a face of a permanent magnet and the other half left movable and adjustable to vary the air gap to obtain a magnetic null. Adjustable limit stops are provided for the armature arms, and the armature shaft is resiliently restrained by a torsion spring.

Brief summary of the invention

The invention relates to electrically-actuated torque motors having a balanced armature, a permanent magnet biasing member and a pair of flux-conducting pole pieces operative with the armature. The general construction of such torque motors is known, but known types are very difficult to properly calibrate and have very little flexibility because of difficulty in matching many variables such as gap settings, flux strength and balanced conditions on either side of null. While adjustable pole pieces are broadly known, such known types impair flux transfer by the use of threaded connections in the flux path or the like, and also cause loss of travel limit adjustments when manipulated. The present invention provides an adjustable pole piece improvement for torque motors wherein flux transfer is not measurably impeded and is applied to a balanced armature to provide independent limit control and flux control settings.

Figure 3:
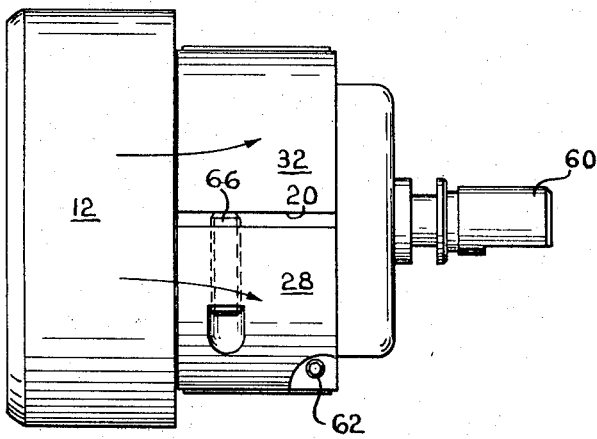
FIGURE 3 is a side plan view of my torque motor.

Referring to the drawings, a preferred form of torque motor incorporating the features of my invention is shown. The torque motor includes a permanent magnetic biasing member 10 of generally U-shaped cross-section forming portions 12 and 14 of opposite polarity.

First and second U-shaped pole pieces 16 and 18 each have a slot 20 and 22 respectively, approximately along a plane of symmetry which extends nearly through the pole pieces, leaving only a thin connecting web 24 and 26 respectively. The pole pieces are fabricated from material which is an excellent conductor of flux but with practically no ability to retain residual magnetism, for example, a nickel alloy Hipernic in order to concentrate flux across two poles.

The slots functionally divide the pole pieces into fixed segments 28 and 30 and movable segments 32 and 34. The pole pieces are most conveniently affixed to opposed polarity portions of magnet 10 by gluing the fixed segments 28 and 30 to the face of portions 12 and 14, respectively, while leaving segments 32 and 34 unglued, but in close contact, except for clearances. Other known attachment means are, of course, acceptable as long as they secure only the fixed segment while permitting both fixed and movable segments to be in effective flux transfer contact with the permanent magnet.

Each U-shaped pole piece, therefore, has a fixed leg 36 and 38 and a movable leg 40 and 42, respectively, in confronting relationship to define operating flux gaps A and B. A pair of radially-extending arms 44 and 46 secured to shaft 48 extend radially into the operating flux gaps and jointly comprise a pivoted balanced armature. The armature arms, which may be fabricated from one piece passing through shaft 48, are preferably comprised of material having high flux conductivity and low residual magnetism retention similar to the pole pieces to reduce to the maximum extent hysteresis loss. A pair of electromagnetic coils 50 and 52 are nested in the cavity formed by U-shaped pole pieces and each forms a loop around one of the radially-extending arms so that when equally energized, each generates a balancing bucking magnetic flux in the armature. When differentially energized, an unbalanced operating flux is produced to deflect the armature, in a pivoting sense, proportional to the degree of imbalance. A clearance space is provided between coil 52 and movable pole pieces 32 and 34, permitting relative movement of the pole pieces as will be later described.

Shaft 48 is affixed or made integral with torsion spring ribs 54 on one end which provide good rigidity, except for permitting torsional deflection in either rotational direction about a free unstressed mechanically-stable position (mechanical null). Spring ribs 54 are fixed to anchor block 56 which, in turn, is fixed in the insert 58 and permanent magnet 10, thus providing a one-end torsion suspension for the shaft. Connecting adapter 60 is formed on the other end of shaft 48 and protrudes from the torque motor for convenient attachment to a controlled device such as, for example, a servo valve flapper arm or the like.

Figure 2:
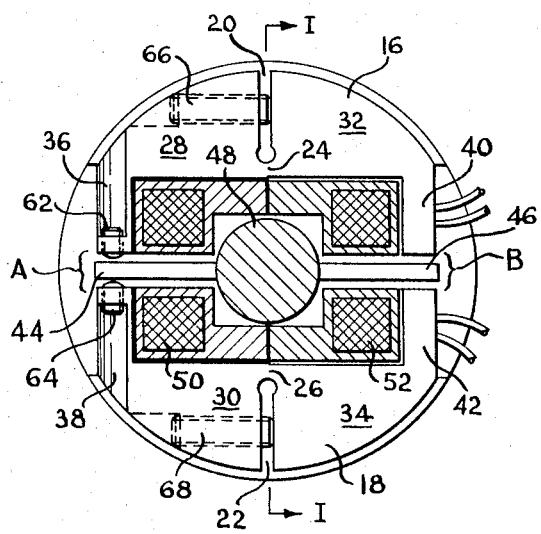
FIGURE 2 is a top view of my torque motor, partially in section, taken along section line 2—2 of FIGURE 1.
Figure 1:
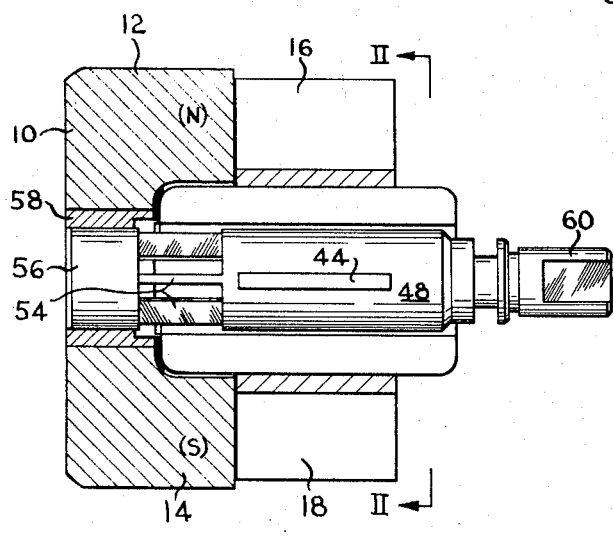
FIGURE 1 is a cross-sectional view of my torque motor except for armature, supporting shaft and torsion spring which are illustrated in full side view.

The torque motor is functionally completed by the provision of a set of adjustable travel limit stops 62 and 64 and one set of gain and balance adjustment screws 66 and 68, as best shown in FIGURE 2, and secured to pole pieces 16 and 18. Travel limit stops are each threaded into fixed legs 36 and 38 to define physical and adjustable limit dimensions for the arm 44 of the armature. Adjustment screws 66 and 68 are threaded into the fixed segments 28 and 30 of the pole pieces generally along a chordal line perpendicular to slots 20 and 22. The end of adjustment screws extends entirely through the fixed segments and abuts the face of movable segments 32 and 34 forming one side of the slots 20 and 22. The location of adjustment screws 66 and 68 radially is offset from connecting webs 24 and 26 such that turning the screws produces a pivoting movement about the webs rotating the movable pole piece segments. By this action, selective adjustment of legs 40 and 42 and thereby, adjustment of gap B, is obtained. The material elasticity of the pole pieces provides a force against the screws to serve as a lock and prevent vibration.

The arrangement described produces a torque motor which is not only easily adjustable, but is adjustable without compromising performance and reliability where prior arrangements have been deficient. One desirable objective is to obtain a match between magnetic and mechanical null. Magnetic null is defined in this case as that position of the armature subject to equal flux attraction when the coils 50 and 52 are equally energized. Mechanical null is that armature position where torsion spring or ribs 54 are torsionally undeflected. Both magnetic and mechanical null are effective to produce a net resultant or true null position. If, however, there is a disparity in magnetic and mechanical null due to production tolerance, for example, the net or true null will have a tendency to shift during service, since any slight decay in magnetic effectiveness or deflection characteristic will upset the balance. In the arrangement described, magnetic null may be quickly brought into alignment with mechanical null by making a differential adjustment on screws 66 and 68. The action may be observed by mounting a pointer on shaft 48.

Also, an often key objective for torque motors is to obtain a known output in response to an absolute input, in this case, the gain between differential current applied to coils 50 and 52 and output rotation of shaft 48. A vernier gain adjustment is obtained by uniform incremental adjustments on screws 66 and 68 which move legs 40 and 42 either towards or away from armature arm 46 a uniform amount. If desired for special applications, gain may be intentionally unbalanced by differential adjustments on screws 66 and 68 to produce, for example, an input to a servo valve which is desired to have a quick-traversal, slow-return characteristic.

It will be further noted that the slots 20 and 22, as best shown in FIGURE 3, are generally parallel and along the natural parting plane of flux from magnet 10 (indicated by arrows) traversing into the pole piece segments 28 and 32. Thus, the slots do not provide a measurable or significant impediment to flux transfer.

It will be understood that variations may be made from the preferred embodiment described without departing from the scope of the invention as defined in the appended claims, either jointly or severally. With only slight additional complexity, webs 24 and 26 may be replaced with hinges. This would require some additional means, well within known techniques, for providing good firm positioning of the pole segments as, for example, a resilient loading member or pivotably anchoring the adjustment screws in movable pole pieces.

I claim:
1. A torque motor comprising:
   a rotatable shaft member;
   resilient spring means connected to said shaft member to yieldably resist rotation in either direction from a free null position;
   armature means having a pair of arms connected to said shaft extending in opposed radial directions;
   a permanent magnet member having first and second positions of opposed polarity disposed on opposite sides of said armature;
   first and second generally U-shaped flux conducting pole pieces each connected to said first and second portions respectively of said permanent magnet member and extending on opposed sides of said armature means and in close proximity thereto, each of said pole pieces having a fixed and a movable segment;
   adjustment means for each pole piece operative to selectively adjust the movable segment for altering its relative proximity to said armature means; and
   electromagnetic coil means for establishing magnetic flux in said armature means of selected polarity and strength.

2. A torque motor as claimed in claim 1 wherein each of said U-shaped pole pieces are slotted to provide a thin deflectable connecting web portion between fixed and movable segments.

3. A torque motor as claimed in claim 2 wherein the slots in said pole piece is disposed substantially along the axis of symmetry of said U-shaped pole pieces.

4. A torque motor as claimed in claim 2 wherein said adjustment means is comprised of a screw member threadedly contained in each fixed segment and abutting each movable segment.

References Cited
UNITED STATES PATENTS

| | | | |
|---|---|---|---|
| 2,891,181 | 6/1959 | Atchley | 335—230 X |
| 2,962,611 | 11/1960 | Atchley | 310—38 X |
| 3,076,920 | 2/1963 | Gordon et al. | 335—230 |
| 3,165,676 | 1/1965 | O'Brien | 310—36 X |

WARREN E. RAY, *Primary Examiner.*

U.S. Cl. X.R.

310—36, 191